(12) United States Patent
Ibrahim

(10) Patent No.: US 6,354,263 B2
(45) Date of Patent: *Mar. 12, 2002

(54) REACTION CHAMBER CHECK VALVE AND GASEOUS FUEL ENGINE USING SAME

(75) Inventor: Dan R. Ibrahim, Bloomington, IL (US)

(73) Assignee: Caterpillar Inc., Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/559,698

(22) Filed: Apr. 27, 2000

Related U.S. Application Data

(60) Provisional application No. 60/131,735, filed on Apr. 30, 1999.

(51) Int. Cl.[7] .............................................. F02B 19/00
(52) U.S. Cl. ...................... 123/276; 123/267; 123/261
(58) Field of Search .............................. 123/276, 267, 123/256, 260, 261, 266, 27 GE; 137/80, 516.15, 519.5

(56) References Cited

U.S. PATENT DOCUMENTS

| | | | |
|---|---|---|---|
| 1,998,785 A | | 4/1935 | Mock ...................... 123/143 B |
| 2,795,106 A | | 6/1957 | Martin ....................... 60/39.37 |
| 3,095,865 A | | 7/1963 | Marks et al. ............... 123/54.7 |
| 3,406,667 A | | 10/1968 | Evans et al. ................. 123/267 |
| 3,446,156 A | | 5/1969 | Lightfood ................... 417/554 |
| 3,459,217 A | | 8/1969 | Callahan ................ 137/516.15 |
| 3,763,834 A | | 10/1973 | Geiger et al. ............... 123/258 |
| 3,871,351 A | | 3/1975 | Geiger et al. ............... 123/258 |
| 3,905,343 A | | 9/1975 | Ryan ........................... 123/277 |
| 4,006,725 A | | 2/1977 | Baczek et al. .............. 123/267 |
| 4,091,772 A | * | 5/1978 | Heater et al. ............... 123/575 |
| 4,338,897 A | | 7/1982 | Drumheller et al. ........ 123/267 |
| 4,389,999 A | * | 6/1983 | Jaqua .......................... 123/536 |
| 4,550,744 A | * | 11/1985 | Igashira et al. ............... 137/80 |
| 4,736,718 A | * | 4/1988 | Linder ......................... 123/267 |
| 5,222,993 A | * | 6/1993 | Crane .......................... 123/256 |
| 5,632,253 A | * | 5/1997 | Paul et al. ................... 123/531 |
| 5,791,374 A | | 8/1998 | Black et al. ............. 137/519.5 |
| 5,947,076 A | * | 9/1999 | Srinivasan et al. ......... 123/267 |

OTHER PUBLICATIONS

Author: Caterpillar, Inc. depicts a valve believed to have been in public use on Jun. 7, 1995.
Author: Caterpillar, Inc. depicts a valve believed to have been in public use on Oct. 7, 1997.
Author: Caterpillar, Inc. depicts a valve believed to have been in public use on Aug. 14, 1998.
Author: Caterpillar, Inc. depicts a valve believed to have been in public use on Nov. 9, 1994.
Author: Caterpillar, Inc. depicts a valve believed to have been in public use on Dec. 16, 1998.
Author: Caterpillar, Inc. depicts a valve believed to have been in public use around Jun. 1989.

* cited by examiner

Primary Examiner—Henry C. Yuen
Assistant Examiner—Hieu T. Vo
(74) Attorney, Agent, or Firm—Liell & McNeil

(57) ABSTRACT

An internal combustion engine comprises an engine housing which defines a main combustion chamber that is separated from a precombustion chamber by a flame communication passageway. The engine housing further defines a fuel supply passage with one end and an opposite end. A source of fuel is fluidly connected to the opposite end of the fuel supply passage. A check valve which includes a valve body with a valve seat and a valve member is positioned between the one end of the fuel supply passage and the precombustion chamber. The valve member is movable between an open position and a closed position. The valve body and the valve member define a relatively wide fluid passage that fluidly connects the fuel supply passage to the precombustion chamber when the valve member is in the open position. The valve body and the valve member define a relatively narrow stagnation region separating the valve seat from the precombustion chamber when the valve member is in the closed position.

20 Claims, 3 Drawing Sheets

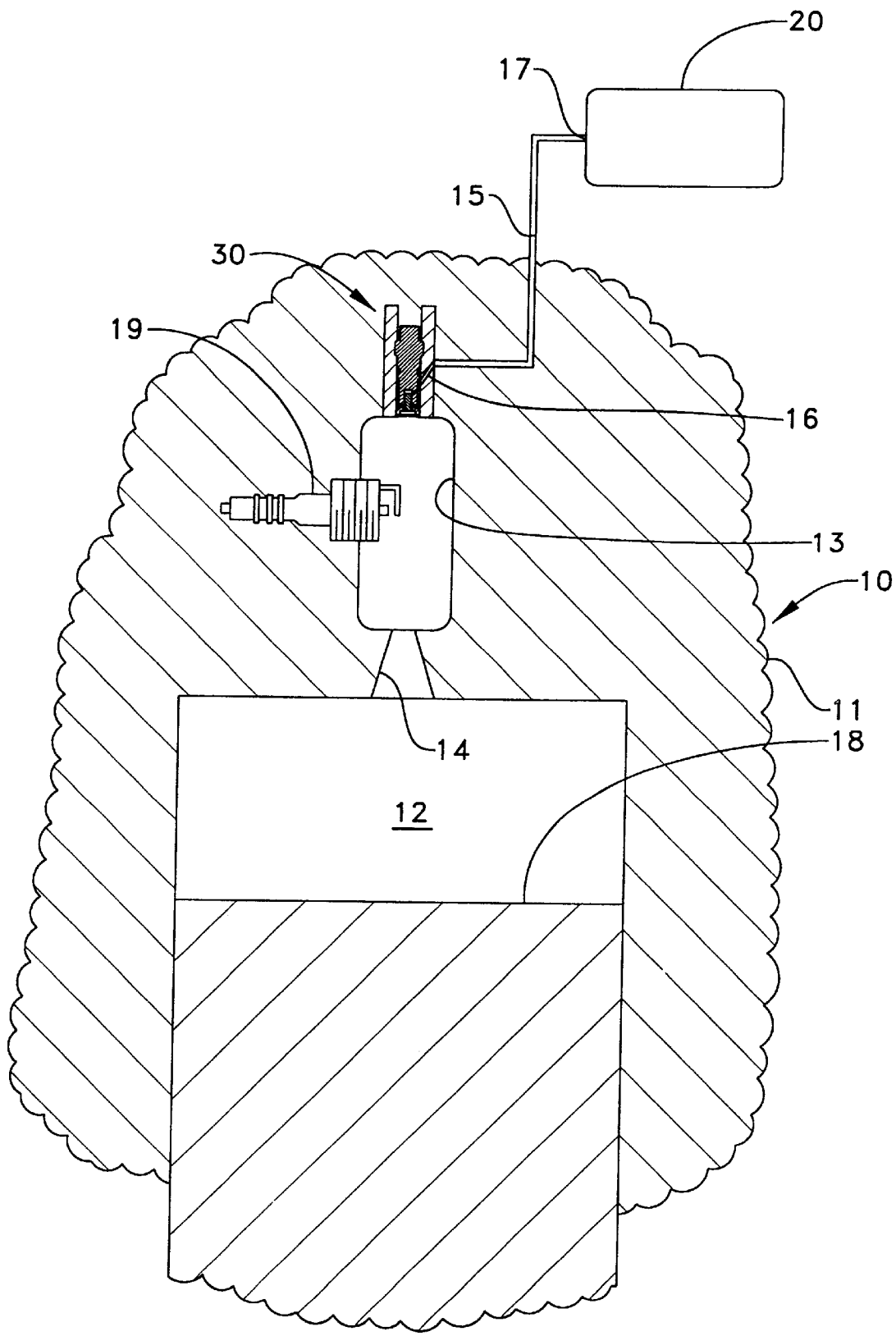
Fig_1_

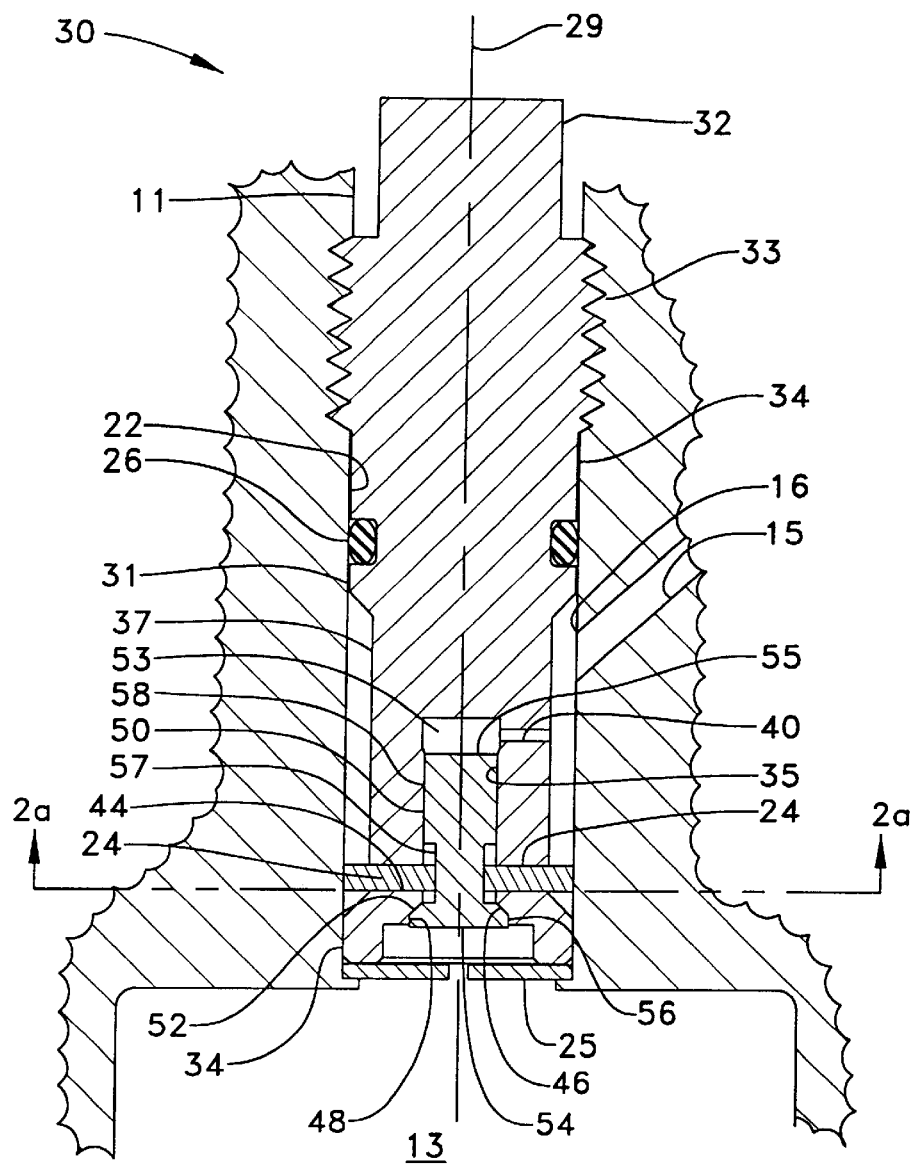
Fig_2_
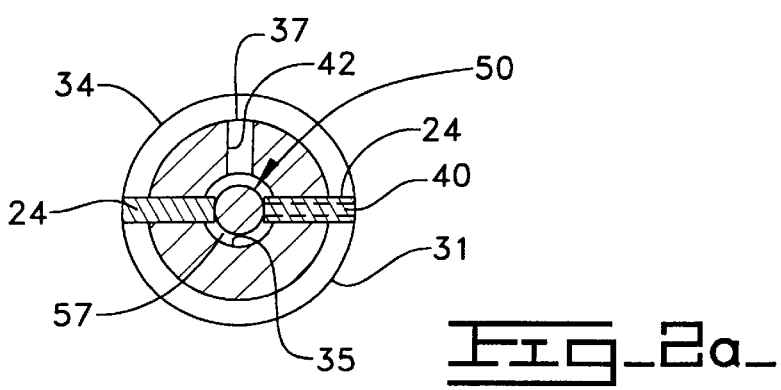
Fig_2a_

US 6,354,263 B2

REACTION CHAMBER CHECK VALVE AND GASEOUS FUEL ENGINE USING SAME

CROSS-REFERENCE TO RELATED APPLICATIONS

This application claims the benefit under 35 U.S.C. §119 of prior provisional application No. 60/131,735 filed Apr. 30, 1999.

TECHNICAL FIELD

This invention relates generally to reaction chamber check valves, and more particularly to a check valve for use adjacent a precombustion chamber of a gaseous fuel internal combustion engine.

BACKGROUND ART

Internal combustion engines which burn gaseous fuels containing high amounts of methane, including natural gas or gas produced from a landfill, have a tendency to produce high exhaust emissions. One solution to reducing exhaust emissions from these engines is to burn leaner gaseous fuel/air mixtures. Some engines which use these leaner mixtures include a precombustion chamber that is in fluid communication with the main combustion chamber. A rich mixture is ignited in the precombustion chamber which serves as the means for igniting the leaner mixture in the main combustion chamber. While this engine configuration has been successful in reducing exhaust emissions, other problems have been observed. Engineers have found that solid deposits produced from the gaseous fuel during the combustion process tend to accumulate on the valve that separates the precombustion chamber from the fuel supply passage, which can cause the engine to misfire.

For instance, engines using a precombustion chamber typically use a ball check valve to separate the fuel supply passage from the precombustion chamber. The ball valve in these engines is mechanically unbiased and is moved by pressure differentials existing between the fuel supply passage and the precombustion chamber. In general, the pressure in the fuel supply passage is constant while the pressure in the precombustion chamber fluctuates with the engine cycle. These ball valves are not always able to seal adequately due to the deposit of solids on the valve seat, pressure wave dynamics, and other reasons not fully understood. When the ball valve fails to seal sufficiently, combustion gasses can flow into the fuel supply passage and cause the engine to misfire.

The present invention is directed to overcoming one or more of the problems described above and to improving performance of gaseous fuel internal combustion engines.

SUMMARY OF THE INVENTION

An internal combustion engine comprises an engine housing which defines a main combustion chamber that is separated from a precombustion chamber by a flame communication passageway. The engine housing further defines a fuel supply passage with one end and an opposite end. A source of fuel is fluidly connected to the opposite end of the fuel supply passage. A check valve, which includes a valve body with a valve seat and a valve member, is positioned between the one end of the fuel supply passage and the precombustion chamber. The valve member is movable between an open position and a closed position. The valve body and the valve member define a relatively wide fluid passage that fluidly connects the fuel supply passage to the precombustion chamber when the valve member is in the open position. The valve body and the valve member define a relatively narrow stagnation region separating the valve seat from the precombustion chamber when the valve member is in the closed position.

BRIEF DESCRIPTION OF THE DRAWINGS

FIG. 1 is a partial sectioned side diagrammatic view of an internal combustion engine according to the present invention.

FIG. 2 is an enlarged sectioned side diagrammatic view of a combustion isolation check valve mounted adjacent a precombustion chamber according to the present invention.

FIG. 2a is a sectioned view through the combustion isolation check valve of FIG. 2 through section lines 2a—2a.

BEST MODE FOR CARRYING OUT THE INVENTION

Figure 3A:
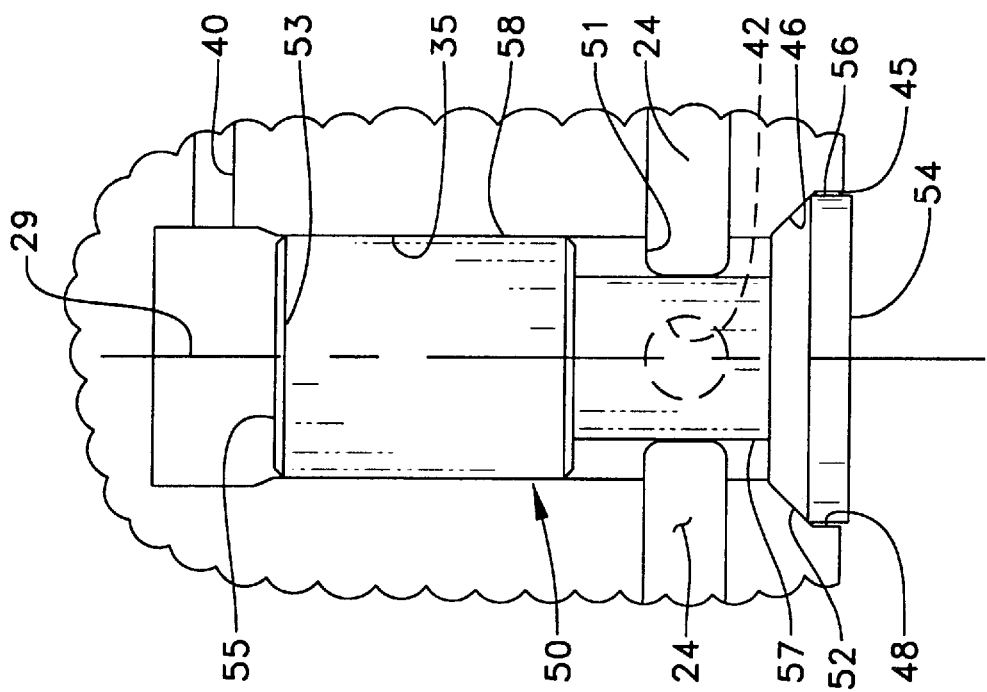
FIGS. 3a and 3b are enlarged partial sectioned side diagrammatic views of the combustion isolation check valve of FIG. 2 shown in its open and closed positions, respectively.

Referring now to FIG. 1, a gaseous fuel internal combustion engine 10 includes an engine housing 11 that defines a main combustion chamber 12 separated from a precombustion chamber 13 by a flame communication passageway 14. A combustion isolation check valve 30 is positioned between precombustion chamber 13 and a downstream end 16 of a fuel supply passage 15. A spark plug 19 or any other suitable ignition device is positioned within precombustion chamber 13. An upstream end 17 of fuel supply passage 15 is fluidly connected to a source of gaseous fuel 20. As with a typical internal combustion engine, a piston 18 reciprocates in main combustion chamber 12 with each engine cycle. Although only one piston 18 is shown, those skilled in the art will appreciate that the typical engine includes a plurality of pistons identical to that shown in FIG. 1.

Referring now to FIGS. 2 and 2a, engine housing 11 defines a bore 22 within which combustion isolation check valve 30 is threadably mounted. In order to facilitate this mounting arrangement, check valve 30 preferably includes a valve body 31 with a lower cylindrical outer surface 34 separated from a hex head 32 by a set of threads 33. Valve body 31 is preferably generally symmetrical about a centerline 29. An o-ring 26 is mounted about the outer surface of valve body 31 in contact with bore 22 in order to prevent leakage in a conventional manner. The bottom surface of valve body 31 is separated from the precombustion chamber 13 by a washer 25. When properly mounted within an engine, valve body 31 preferably defines a valve annulus 37 that is fluidly connected to the downstream end 16 of the fuel supply passage 15.

Figure 3B:
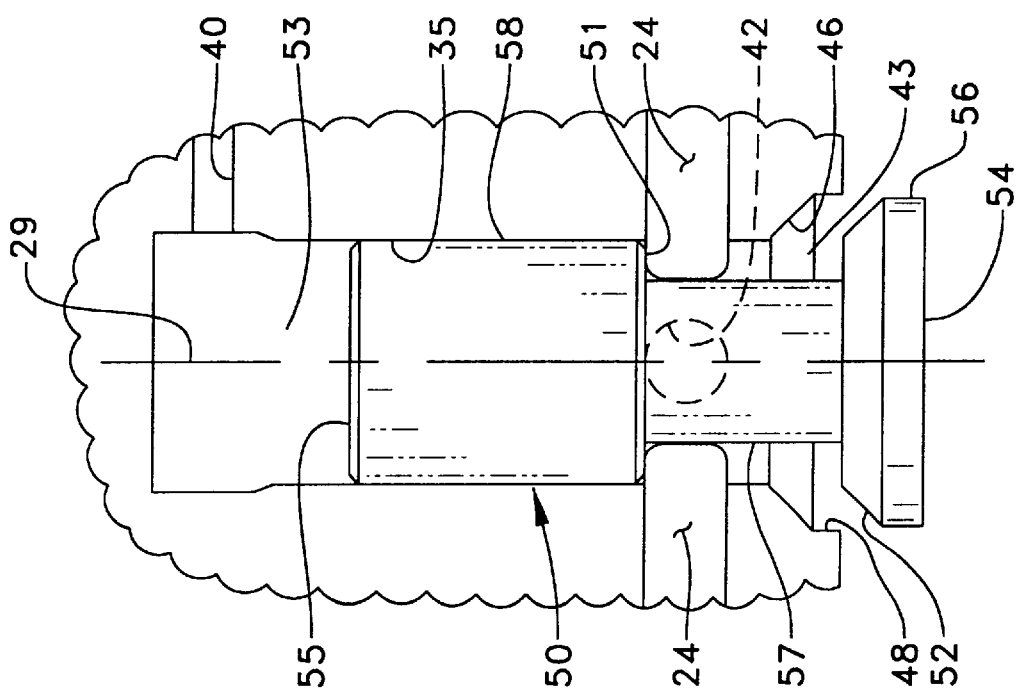

Referring now in addition to FIGS. 3a and 3b, a valve member 50 is movably mounted in an internal guide bore 35 defined by valve body 31. Valve member 50 is moveable between an upward closed position as shown in FIGS. 2 and 3b, and a downward open position as shown in FIG. 3a. Valve member 50 defines a valve member annulus 57 and includes a cylindrical guide surface 58 which is guided in internal guide bore 35. A fluid cavity 53 is defined by valve body 31 and an opening fluid pressure surface 55 of valve member 50. Pressure equalization passage 40 opens into fluid cavity 53 thus exposing opening fluid pressure surface 55 to fluid pressure in fuel supply passage 15. A cross passage 42 is defined by valve body 31 to open into valve member annulus 57. Cross passage 42 and pressure equalization passage 40 act to expose opposite ends of guide surface 58 to fluid pressure in fuel supply passage 15.

When valve member 50 is in its upward closed position, a valve surface 52 of valve member 50, which is preferably rounded, is received in contact with a conical valve seat 46 of valve member 31. When valve member 50 is in its downward open position, an upper surface 51 of annulus 57 is in contact with at least one cylindrical dowel 24. Each cylindrical dowel 24 is attached to and mounted in a dowel bore 44 that is defined by valve body 31. While check valve 30 has been illustrated as using a pair of cylindrical dowels 24 as the stop component to limit the downward movement of valve member 50, an alternate number or placement of dowels 24 or another suitable stop component, such as an end cap, could be substituted.

Valve member 50 includes a cylindrical portion 56 which shares common centerline 29 with an internal cylindrical wall 48 that is included on valve body 31. When valve member 50 is in its downward open position, cylindrical portion 56 and internal cylindrical wall 48 are located at nonoverlaping positions along centerline 29. A relatively wide fluid passage 43 that is defined by valve member 50, valve body 31, cross passage 42 and pressure equalization passage 40 fluidly connects the downstream end 16 of fuel supply passage 15 to precombustion chamber 13 when valve member 50 is in this open position. When valve member 50 is in its upward closed position, a relatively narrow stagnation region 45 is defined by a diametrical clearance area between cylindrical portion 56 and internal cylindrical wall 48. Stagnation region 45, which is relatively narrow in relation to fluid passage 43, separates valve seat 46 from precombustion chamber 13. While stagnation region 45 is relatively small in volume, the diametrical clearance area between cylindrical portion 56 and internal cylindrical wall 48 is preferably greater than the guide clearance between guide surface 58 and guide bore 35 to allow valve member 50 sufficient room to move and seat.

When valve member 50 moves toward its upward closed position, stagnation region 45 acts to inhibit combustion flow near, and the deposit of solids on, valve seat 46 because of the relatively close clearance between cylindrical portion 56 and internal cylindrical wall 48. This relatively narrow stagnation region 45 allows cylindrical portion 56 and internal cylindrical wall 48 to come into close proximity to one another, thus protecting the sealing surfaces of valve member 50. When valve member 50 moves toward its downward open position, the shearing force of fluid flowing through stagnation region 45 can act to remove any solids that may have deposited on valve seat 46. Thus, the shearing fluid force through the relatively narrow stagnation region 45 when the valve begins to open can act to continually clear the area of any built up solid deposits. Additionally, when valve member 50 is in its downward open position, cylindrical portion 56 and internal cylindrical wall 48 are in nonoverlaping positions along centerline 29 such that adequate flow around valve member 50 is possible.

Although valve member 50 could be mechanically biased in one direction or another by the inclusion of a spring, it is preferably not mechanically biased such that fluid pressures existing in the fuel supply passage 15 and the precombustion chamber 13 provide whatever pressure differential that is needed to move valve member 50 in one direction or the other. Thus, valve member 50 can be thought of as including an opening fluid pressure surface 55 that is exposed to fluid pressure in fluid cavity 53, and a closing fluid pressure surface 54 that is exposed to fluid pressure in the lower portion of internal guide bore 35, which communicates with precombustion chamber 13. Preferably, conical valve seat 46, internal guide bore 35, guide surface 58 and valve surface 52 all share a common centerline 29 to allow for better concentricity between these seats and surfaces. By maintaining a common centerline among these elements, there is less chance of unwanted solids traveling upward into the guide region due to misalignment of components.

INDUSTRIAL APPLICABILITY

Although the present invention has been illustrated as preferably for use as a combustion isolation check valve in a gaseous fuel engine, it could potentially be used in other places where there is a need to protect a valve seat of a valve positioned adjacent a chemical reaction chamber, such as a combustion space. Thus, the reaction chamber check valve of the present invention could find potential application in stratified engines, if needed, and possibly even in some non-engine applications where there is a need to protect a valve seat from a chemical reaction, such as combustion, occurring adjacent the valve.

Referring back to FIGS. 1 and 2, when engine 10 is undergoing the intake portion of its cycle, check valve 30 opens and allows relatively pure gaseous fuel (not mixed with air) to flow into precombustion chamber 13. Due, at least in part to the fluid connection provided by flame transfer passage 14, some air from the relatively lean mixture existing in main combustion chamber 12 makes its way into precombustion chamber 13 to provide a relatively rich fuel/air mixture for ignition by spark plug 19. When piston 18 begins moving upward for the compression stroke, this raises pressure both in main combustion chamber 12 and precombustion chamber 13 and provides a means by which some of the air in the lean air mixture in main combustion chamber 12 can find its way into precombustion chamber 13. As pressure rises, it eventually produces a fluid pressure imbalance on valve member 50 causing it to move toward its closed position.

At an appropriate timing, the combustion event takes place. Relatively narrow stagnation region 45 prevents substantial amounts of combustion gasses and solids from traveling upward toward valve seat 46, thus protecting valve seat 46 from the collection of solid deposits. Further, when valve member 50 is allowed to move toward its downward open position at the end of the combustion event, any debris that might have accumulated on cylindrical portion 56 is sheared away by the flow past valve member 50 when it first begins to open. The present invention also prevents the penetration of solid deposits into the area surrounding guide surface 58 not only because guide surface 58 is positioned a relatively large distance from pre-combustion chamber 13, but because guide surface 58 is bound on both sides by equal pressure gaseous fuel. Because pressure equalization passage 40 and cross passage 42 expose opposing ends of guide surface 58 to equal pressure, it is unlikely that undesirable solid material will penetrate into the area surrounding guide portion 58.

It should be understood that the above description is intended for illustrative purposes only, and is not intended to limit the scope of the present invention in any way. For instance, while a pair of cylindrical dowels have been illustrated as the stop component for the present invention, it should be appreciated that a different number of dowels or an end cap could be used. Thus, those skilled in the art will appreciate that various modifications could be made to the disclosed embodiment without departing from the intended scope of the present invention, which is defined in terms of the claims set forth below.

What is claimed is:

1. An internal combustion engine comprising:
    an engine housing defining a main combustion chamber separated from a precombustion chamber by a flame communication passageway, and further defining a fuel supply passage with one end and an opposite end;
    a source of fuel fluidly connected to said opposite end of said fuel supply passage;
    a check valve, which includes a valve body with a valve seat and a valve member, positioned between said one end of said fuel supply passage and said precombustion chamber, and said valve member being movable between an open position and a closed position;
    said valve body and said valve member defining a relatively wide fluid passage that fluidly connects said fuel supply passage to said precombustion chamber when said valve member is in said open position; and
    said valve body and said valve member defining a relatively narrow stagnation region separating said valve seat from said precombustion chamber when said valve member is in said closed position.

2. The engine of claim 1 wherein said source of fuel is a source of gaseous fuel.

3. The engine of claim 1 wherein said valve member includes a cylindrical portion;
    said valve body includes an internal cylindrical wall; and
    said relatively narrow stagnation region includes a diametrical clearance between said cylindrical portion and said internal cylindrical wall.

4. The engine of claim 1 wherein said valve member and said valve body include a common centerline; and
    those portions of said valve member and said valve body that define said relatively narrow stagnation region are located at nonoverlaping positions along said centerline when said valve member is in said open position.

5. The engine of claim 1 wherein said valve body defines a guide bore;
    said valve member includes a guide surface guided in said guide bore and a valve surface positioned adjacent said valve seat; and
    said valve seat, said guide bore, said guide surface and said valve surface all share a common centerline.

6. The engine of claim 1 wherein said valve member has a cylindrical guide surface bounded on opposite ends by fluid chambers in fluid communication with said source of fuel when said valve member is in said closed position.

7. The engine of claim 1 further comprising a stop component attached to said valve body;
    said valve member being in contact with said stop component when in said open position, but being out of contact with said stop component when in said closed position.

8. The engine of claim 7 wherein said stop component is at least one cylindrical dowel mounted in said valve body.

9. The engine of claim 1 wherein said valve member has a first fluid pressure surface exposed to fluid pressure in said precombustion chamber, and an opposing fluid pressure surface exposed to fluid pressure in said fuel supply passage.

10. The engine of claim 1 wherein said valve member is mechanically unbiased.

11. A gaseous fuel internal combustion engine comprising:
    an engine housing defining a main combustion chamber separated from a precombustion chamber by a flame communication passageway, and further defining a fuel supply passage with one end and an opposite end;
    a source of gaseous fuel fluidly connected to said opposite end of said fuel supply passage;
    a check valve, which includes a valve body with a conical valve seat and a valve member with a centerline, positioned between said one end of said fuel supply passage and said precombustion chamber, and said valve member being movable between an open position and a closed position;
    said valve body and said valve member defining a relatively wide fluid passage that fluidly connects said fuel supply passage to said precombustion chamber when said valve member is in said open position;
    said valve body and said valve member defining a relatively narrow stagnation region separating said valve seat from said precombustion chamber when said valve member is in said closed position; and
    those portions of said valve member and said valve body that define said relatively narrow stagnation region are located at nonoverlaping positions along said centerline when said valve member is in said open position.

12. The engine of claim 11 wherein said valve member includes a cylindrical portion;
    said valve body includes an internal cylindrical wall; and
    said relatively narrow stagnation region includes a diametrical clearance between said cylindrical portion and said internal cylindrical wall.

13. The engine of claim 12 wherein said valve member has a first fluid pressure surface exposed to fluid pressure in said precombustion chamber, and an opposing fluid pressure surface exposed to fluid pressure in said fuel supply passage.

14. The engine of claim 13 wherein said valve member includes a guide surface which is bounded on opposite ends by fluid chambers in fluid communication with said source of gaseous fuel when said valve member is in said closed position.

15. The engine of claim 14 wherein said guide surface is guided in a guide bore defined by said valve body;
    said valve member includes a valve surface positioned adjacent said valve seat;
    said valve seat, said guide bore, said guide surface and said valve surface all share a common centerline that is concentric with said centerline.

16. The engine of claim 15 further comprising a stop component attached to said valve body;
    said valve member being in contact with said stop component when in said open position, but being out of contact with said stop component when in said closed position.

17. The engine of claim 16 wherein said valve member is mechanically unbiased.

18. The engine of claim 17 wherein said stop component is at least one cylindrical dowel.

19. A combustion isolation check valve comprising:
    a valve body having a valve seat and defining an inlet and an outlet;
    a valve member positioned in said valve body between said inlet and said outlet and being movable between an open position and a closed position;

said valve body and said valve member defining a relatively wide fluid passage that fluidly connects said inlet to said outlet when said valve member is in said open position; and said valve body and said valve member defining a relatively narrow stagnation region separating said valve seat from said outlet when said valve member is in said closed position.

20. The check valve of claim 19 wherein said valve member has a centerline and includes a cylindrical portion; said valve body includes an internal cylindrical wall;

said relatively narrow stagnation region includes a diametrical clearance between said cylindrical portion and said internal cylindrical wall; and those portions of said valve member and said valve body that define said relatively narrow stagnation region are located at nonoverlaping positions along said centerline when said valve member is in said open position.

* * * * *